US009157597B2

(12) United States Patent
Gürtl et al.

(10) Patent No.: US 9,157,597 B2

(45) Date of Patent: Oct. 13, 2015

(54) LIGHT-EMITTING UNIT FOR A PROJECTOR LAMP

(71) Applicant: ZIZALA LICHTSYSTEME GMBH, Wieselburg (AT)

(72) Inventors: Josef Gürtl, Kilb (AT); Josef Plank, Purgstall/Erlauf (AT)

(73) Assignee: ZIZALA LICHTSYSTEME GMBH, Wieselburg (AT)

( * ) Notice: Subject to any disclaimer, the term of this patent is extended or adjusted under 35 U.S.C. 154(b) by 0 days.

(21) Appl. No.: 14/394,327

(22) PCT Filed: Oct. 22, 2013

(86) PCT No.: PCT/AT2013/050205

§ 371 (c)(1),
(2) Date: Oct. 14, 2014

(87) PCT Pub. No.: WO2014/094017

PCT Pub. Date: Jun. 26, 2014

(65) Prior Publication Data

US 2015/0085523 A1 Mar. 26, 2015

(30) Foreign Application Priority Data

Dec. 20, 2012 (AT) .............................. A 50608/2012

(51) Int. Cl.

| | |
|---|---|
| ***B60Q 1/04*** | (2006.01) |
| ***F21S 8/10*** | (2006.01) |
| *F21W 101/10* | (2006.01) |
| *F21Y 105/00* | (2006.01) |

(52) U.S. Cl.

CPC ............. *F21S 48/145* (2013.01); *F21S 48/115* (2013.01); *F21S 48/1154* (2013.01); *F21S 48/1241* (2013.01); *F21S 48/1291* (2013.01); *F21S 48/13* (2013.01); *F21S 48/1317* (2013.01); *F21S 48/1388* (2013.01); *F21S 48/1747* (2013.01); *F21W 2101/10* (2013.01); *F21Y 2105/001* (2013.01)

(58) Field of Classification Search

CPC . F21S 48/115; F21S 48/1154; F21S 48/1241; F21S 48/1291; F21S 48/13; F21S 48/1317; F21S 48/1388; F21V 13/04; F21V 7/0025; F21V 15/01; F21K 9/00; F21W 2101/10; F21Y 2105/001; F21Y 2101/02; H01L 25/0753; H01L 33/58

USPC ......... 362/19, 227, 235, 244, 249.01, 249.02, 362/290, 308, 309, 325, 328, 330, 336, 354, 362/355, 475, 507, 538, 539–545; 353/22, 353/102

See application file for complete search history.

(56) References Cited

U.S. PATENT DOCUMENTS

| | | | | |
|---|---|---|---|---|
| 7,312,927 | B2 * | 12/2007 | Bogner et al. | 359/630 |
| 8,057,072 | B2 * | 11/2011 | Takenaka et al. | 362/311.02 |
| 8,622,573 | B2 * | 1/2014 | Kubis et al. | 362/231 |
| 8,783,904 | B2 * | 7/2014 | Vissenberg et al. | 362/244 |

* cited by examiner

*Primary Examiner* — Hargobind S Sawhney

(74) *Attorney, Agent, or Firm* — Sutherland Asbill & Brennan LLP

(57) ABSTRACT

The invention relates to a lighting unit (1) for a headlight, in particular a motor vehicle headlight, comprising a plurality of light sources (2), a light guide unit (3) having a plurality of light guides (30) and a downstream projection lens (4), wherein each light guide (30) has a light decoupling face (30*a*), and wherein each light source (2) couples light precisely into a light guide (30) associated therewith, and wherein adjacent light guides (30) are separated from one another by partition walls (31, 32). In accordance with the invention, at least one diaphragm element (5) is arranged between the light guide unit (3) and the projection lens (4), which diaphragm element (5) has apertures (50) separated from one another by aperture partition walls (51, 52), wherein the diaphragm element (5) is arranged in such a way that an aperture (50) is arranged to the front of each light decoupling face (30*a*), and wherein the apertures (50) correspond substantially in terms of shape and size to the light decoupling faces (30*a*) associated therewith, and wherein, on the faces (5*a*) of the at least one diaphragm element (5) facing away from the light guide unit (3), at least part of the aperture partition walls (51, 52) has a smaller wall thickness (b) than the partition walls (31, 32) of the light guide unit (3) associated with the respective aperture partition walls (51, 52).

25 Claims, 3 Drawing Sheets

LIGHT-EMITTING UNIT FOR A PROJECTOR LAMP

Figure 1:
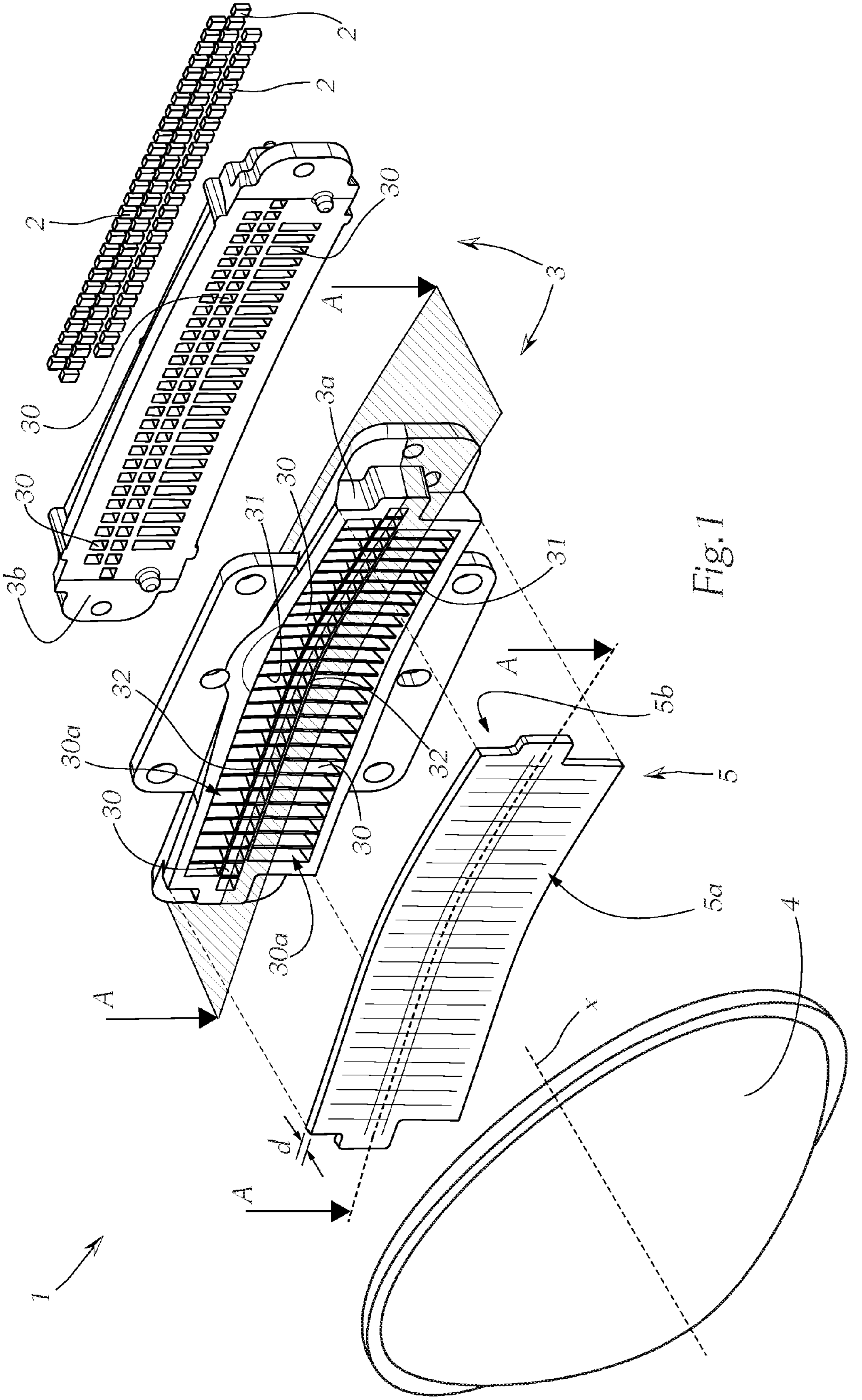

The invention relates to a lighting unit for a headlight, in particular a motor vehicle headlight, comprising a plurality of light sources, a light guide unit having a plurality of light guides, and a downstream projection lens, wherein each light guide has a light decoupling face, and wherein each light source couples light precisely into a light guide associated with said light source, and wherein adjacent light guides are separated from one another by partition walls.

The invention also relates to a vehicle headlight for a motor vehicle comprising at least one such lighting unit.

With such a lighting unit, it is possible to establish a lighting function, such as a dipped headlight beam distribution or a main beam distribution, from a plurality of partial-light distributions. These partial-light distributions can be actuated individually by individual actuation of the light sources, for example such that parts of the light distribution are selectively masked or dimmed or only certain parts of the light distribution can be switched on or operated in a dimmed manner. It is thus possible to control the light distribution practically arbitrarily in accordance with the driving situation.

Functions that can be performed with this technology include, for example, partial main beam, in which case segments in the light exposure of the main beam distribution are switched off in order to reduce the glare from oncoming traffic, displacement of the light focus in the dipped headlight beam (compare with cornering light), reduction of the light distribution to the front of the vehicle for the purpose of reducing the glare from oncoming traffic when the road is wet (adverse weather light), etc.

The individual light segments in the light distribution are produced by means of light guides, which are combined to form a light guide unit, and by means of which light guides the light emitted from the artificial light sources is bundled in the beam direction. The light guides have a relatively small cross section and therefore emit the light of the individual light sources associated therewith in the beam direction in a very concentrated manner. In this context, a light module is disclosed in AT 510 437 A4 which has a light guide in the form of an optical waveguide, referred to there as a light tunnel, and also a plurality of light sources.

The concentrated radiation of the light guides is desirable, for example so as to meet legal requirements with regard to the light/dark line of the dipped headlight beam of a motor vehicle headlight. In addition, clearly defined light segments produced by means of the light guides have the advantage that precisely delimited regions in a light exposure can be masked.

The light guides are inevitably separated from one another so as to be able to produce separate light segments. Here, a light guide unit, which has a number of light guides, is usually manufactured in one piece (or sometimes in two pieces: a front and a rear part in the light exit direction—however, this is incidental for the present invention), and the individual light guides are separated from one another, specifically by walls or partition webs, which extend in the light exit direction into the region of the light decoupling faces of the individual light guides. The light guide units are typically formed from metal or plastic; with a two-part structure as mentioned briefly above, the two parts may also be manufactured from different materials.

With the "one-piece" manufacture of the light guide unit with the light guides formed therein, there is the disadvantage however that the wall thickness of the (partition) walls or (partition) webs between adjacent light guides in the region of the light decoupling faces of the light guides has a certain value, which cannot be undershot during the manufacturing process or that can only be undershot with high manufacturing outlay. However, an excessively large wall thickness of the partition walls between the light guides results in the formation of strips, in particular vertical and/or horizontal strips, in the light exposure.

The object of the invention is to create a lighting unit for headlights, with which the above-described disadvantageous effects can be prevented or significantly reduced easily and cost-effectively.

The object is achieved with a lighting unit as mentioned in the introduction, in that, in accordance with the invention, at least one diaphragm element is arranged between the light guide unit and the projection lens, which diaphragm element has apertures separated from one another by aperture partition walls, wherein the diaphragm element is arranged in such a way that an aperture is arranged to the front of each light decoupling face, and wherein the apertures correspond substantially in terms of shape and size to the light decoupling faces associated therewith, and wherein, on the faces of the at least one diaphragm element facing away from the light guide unit, at least part of the aperture partition walls has a smaller wall thickness than the partition wall of the at least one light guide unit associated with the respective aperture partition wall.

In terms of manufacture, a diaphragm element with apertures corresponding to the light decoupling faces of the light guides in the light guide unit can be formed much more easily with a wall thickness of the aperture partition walls that is (significantly) smaller than the thickness of the partition walls of the light guides in the region of the light decoupling faces thereof, such that, by arranging such a diaphragm element between a light guide unit and projection lens, the distance between the individual light segments in the light exposure produced by means of the individual light guides can be easily significantly reduced or completely eliminated. Strips in the light exposure can thus be reduced or completely eliminated.

In some circumstances, it may be advantageous to provide a plurality of diaphragm elements. However, it is generally advantageous for manufacturing, assembly and storage reasons if exactly one diaphragm element is provided which has a number of apertures corresponding to the number of light decoupling faces.

In accordance with a specific embodiment, the light guides are arranged in at least two rows arranged one above the other, wherein the light guides are preferably arranged in exactly three rows arranged one above the other.

With such a light guide unit, light segments can also be masked in a vertical direction (vertically with respect to a measurement wall arranged at a certain distance, for example 10 or 25 meters).

In accordance with a variant of the invention, a separate diaphragm element is provided for each row of light guides or at least for one of the rows.

Typically, all light decoupling faces lie in a common plane, which may be curved in some circumstances. In this case, it is advantageous if merely exactly one diaphragm element is provided, which is formed in accordance with the "light exit face" of the light guide unit. This diaphragm element then also extends over all rows, for example over all three rows of light guides.

However, one of the rows or a number of rows may also be offset from one another in the light exit direction, for example. With use of such a light guide unit, a "planar" diaphragm element may only rest against the foremost row of light guides, whereas a distance from the other rows is produced as a result of the offset of these rows. If a distance has negative photometric effects on the light exposure, the diaphragm element can be shaped accordingly, for example bent, at appropriate locations so as to minimise or completely eliminate the distance between the diaphragm element and light guides, and thus follows the shape of the light exit face of the light guide unit.

In terms of manufacture, it may however be easy in some circumstances to provide those rows arranged at the same “height” with their own diaphragm element, such that, although a plurality of individual parts are necessary, there is no need to shape a diaphragm element.

So as to obtain an optimal, in particular clear, reproduction of the light segments with the individual light guides, the at least one diaphragm element is arranged substantially in a focal plane of the projection lens.

The face of the light guide unit formed by the light decoupling faces of the light guides typically is not planar, but is formed in accordance with the progression of the focal plane of the projection lens, that is to say curved horizontally and preferably also vertically in the direction of the lens.

Accordingly, that is to say following the shape of this face of the light guide unit, the diaphragm element is also curved accordingly and is formed congruently with this face.

The light decoupling faces usually lie in the focal plane of the projection lens. In this case, care should be taken to ensure that the diaphragm element is as thin as possible as viewed in the light exit direction so that the face of the diaphragm element facing the lens, this face now defining the actual decoupling face, is arranged as closely as possible to the focal plane of the projection lens.

However, the light decoupling faces may also be offset rearwards, at least by the thickness of the diaphragm element in the light exit direction, such that the lens-side face of the diaphragm element can then be arranged exactly in the focal plane of the projection lens.

It is in particular advantageous from an optical viewpoint if the at least one diaphragm element is arranged directly adjacent to the light guide unit, preferably contacting the light guide unit in the region of the face thereof formed by the light decoupling faces.

Specifically, this means that the aperture partition walls contact the partition walls between the light guides; light from a light guide is thus reliably prevented from passing over into an unassociated aperture or into an aperture associated with an adjacent light guide.

In addition, the lens-side face of the diaphragm element can thus be arranged as precisely as possible in the focal plane of the projection lens.

In accordance with a first embodiment of the invention, the wall thickness of the aperture partition walls is constant over the entire thickness of the at least one diaphragm element. In this case, it must then be sought to manufacture the aperture partition walls in their respective entirety with minimal wall thickness.

In accordance with another embodiment of the invention, the wall thickness of the aperture partition walls reduces over the thickness of the at least one diaphragm element in the light exit direction, wherein the width of the aperture partition walls on the face facing the light guide unit corresponds to the wall thickness of the associated partition walls between the light guides, in particular in the region of the light decoupling faces of the light guides.

In this variant the aperture partition walls adjoin the partition walls between the light guides directly and without a step and taper towards the light decoupling face of the apertures to the necessary extent.

Each light guide is typically delimited by two substantially vertical walls and two substantially horizontal walls, wherein the light decoupling faces of the light guides delimited by the walls preferably form a rectangle or a square.

Rectangular or potentially rectangular light segments in the light exposure are usually desirable, wherein, depending on the vertical position, these light segments may have different heights in the vertical direction, whereas all light segments are usually of equal width in the horizontal direction.

A light guide is therefore usually delimited in each case by four walls, wherein, with light guides arranged side-by-side or light guides arranged one above the other, the common walls are referred to as partition walls or constitute such walls. Those walls that are arranged as partition walls between light guides arranged one above the other generally actually run horizontally (terms such as horizontally and vertically always relate to the lighting unit in the position of installation), whereas the upper and lower walls of the uppermost/lowermost row of light guides respectively directed against the light exit direction may also be formed running in a manner slightly curved downwardly/upwardly, which is why the term “substantially” has been used.

Here, in accordance with the invention, at least the aperture partition walls arranged on the face facing away from the light guide unit and associated with the vertical and/or the horizontal partition walls between the light guides may have a smaller wall thickness than the associated partition walls of the light guide unit, wherein preferably all aperture partition walls arranged on the faces facing away from the light guide unit and associated with the partition walls between the light guides have a smaller wall thickness than the associated partition walls of the light guide unit.

Depending on which strips in the light exposure are considered to be inconvenient or are not permitted by law, the appearance of only the vertical or only the horizontal strips in the light exposure may be reduced or eliminated. However, the appearance of all strips, that is to say in particular all vertical and horizontal strips in the light exposure, is usually reduced or completely eliminated.

The at least one diaphragm element is preferably formed from a metal, for example a sheet metal or a metal foil or a plastic, preferably a temperature-resistant plastic.

The use of metal, in particular the use of a metal foil, has the advantage that this is thin, heat-resistant and durable.

The use of plastic has the advantage that this can be formed more easily than metal. However, plastic also has to be coated with a reflective or (high-)gloss layer, for example coated with aluminium by means of vapour deposition.

The diaphragm element is typically fastened directly to the light guide unit, for example riveted, welded, adhesively bonded, screwed or clamped thereto.

It is further advantageous if the aperture partition walls reflect light and in particular are highly reflective.

This embodiment is intended to avoid light losses as a result of light absorption at the aperture partition walls.

Metal, for example a metal foil or a sheet metal element, is usually matt on one side and glossy on the other side. If a metal is used that is glossy on both sides, apertures delimited continuously by reflective partition walls are formed in a blanking process, by means of which the apertures are punched into the metal.

It is advantageous in particular if the metal is highly reflective here, that is to say has a degree of reflection greater than or equal to 95%.

By contrast, with a diaphragm element made of plastic, it is possible for the apertures to be covered, for example coated, on the inner faces thereof with a reflective layer, for example.

Furthermore, the apertures in the diaphragm element material can be manufactured by means of blanking, in particular by means of fine blanking or by means of laser cutting.

Laser cutting is suitable in particular for manufacturing aperture partition walls with continuously constant wall thickness, whereas with a blanking process the partition walls can be produced with a wall thickness of the aperture partition walls that tapers over the thickness of the diaphragm element, as described above.

The light sources are preferably LED light sources, wherein each LED light source comprises at least one light-emitting diode.

It is furthermore also advantageous if each LED light source can be actuated and switched on and off and/or dimmed separately, wherein each light-emitting diode of an LED light source can preferably be actuated and switched on and off and/or dimmed separately.

The at least one diaphragm element is typically also formed as a two-dimensional component part, that is to say has a significantly smaller thickness compared with width and height. Typical values for the width of an aperture are approximately 70 mm, the height of the aperture is approximately 20 mm, and the thickness is approximately 2 mm. These values are purely exemplary and serve merely to illustrate the dimensions.

Figure 2:
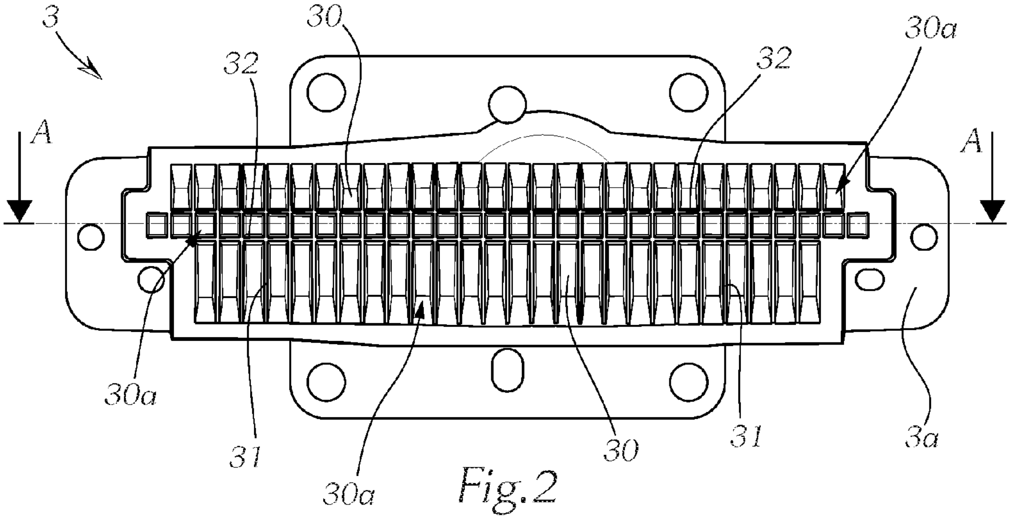
Figure 3:
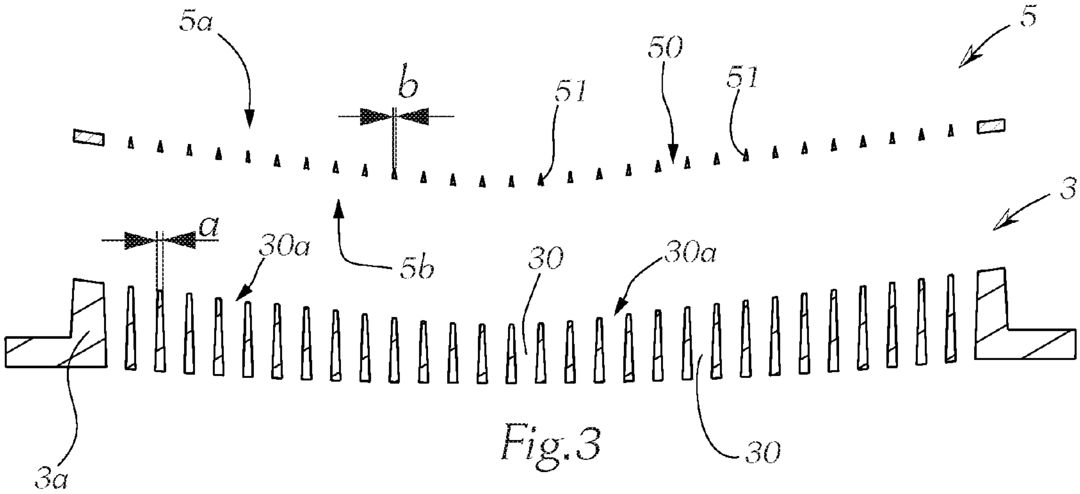
Figure 4:
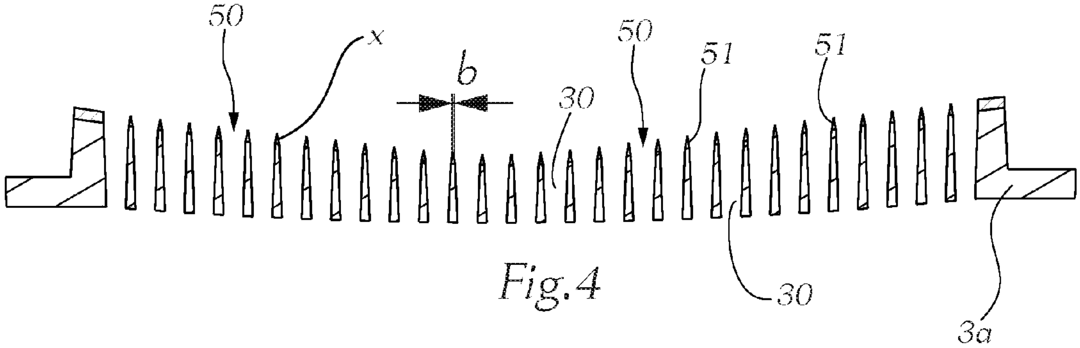
Figure 5:
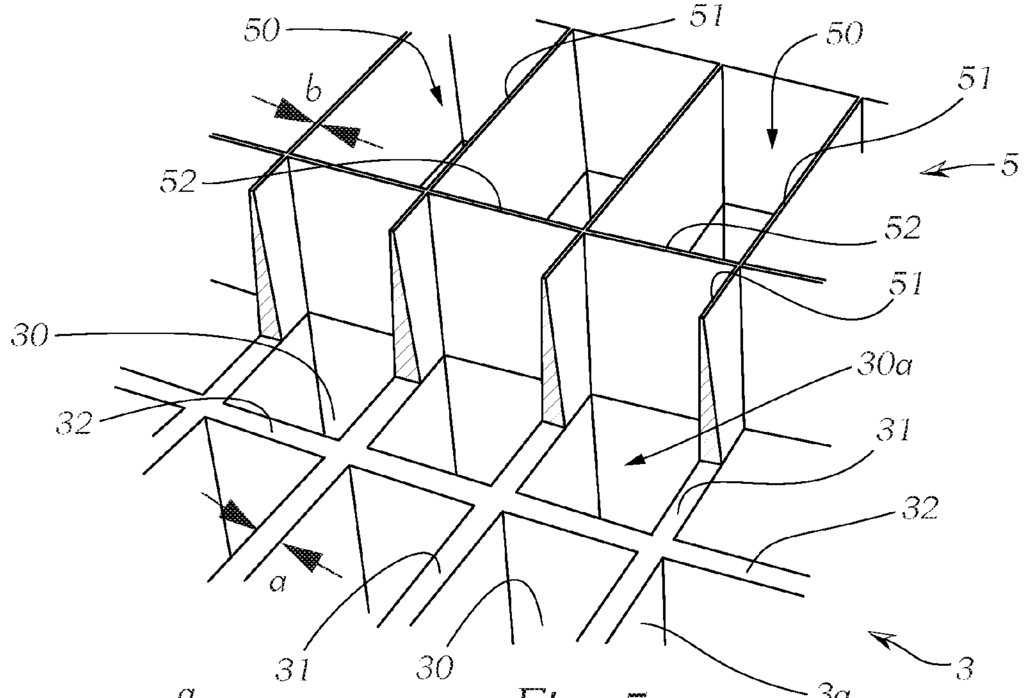
Figure 6:
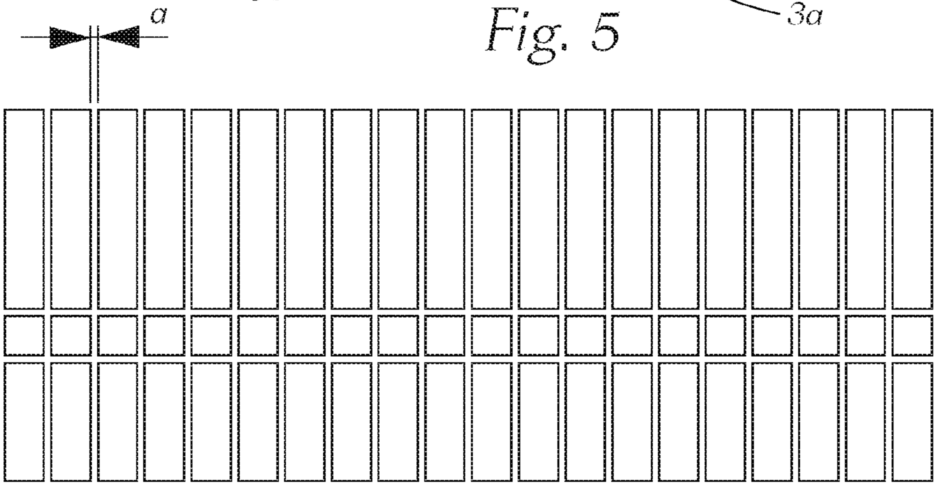
Figure 7:
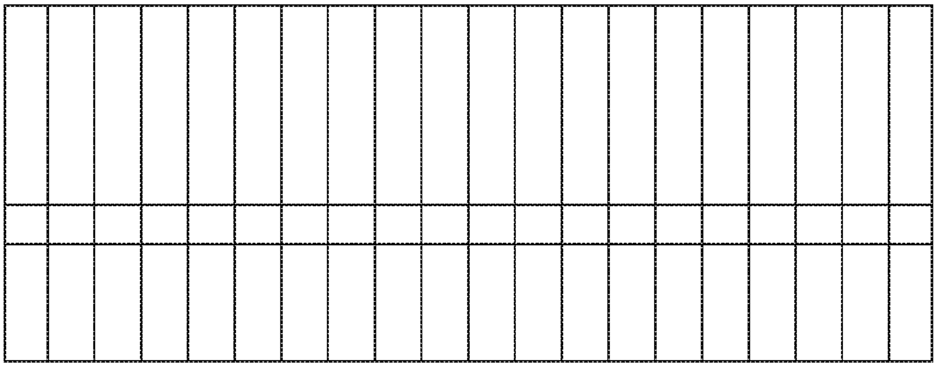

The invention will be explained in greater detail hereinafter with reference to the drawing of an exemplary embodiment of the invention, in which FIG. 1 shows a perspective exploded illustration of a lighting unit according to the invention, FIG. 2 shows a view of the front side of the light guide unit shown in FIG. 1, FIG. 3 shows a section through the light guide unit and the associated diaphragm element along the plane A-A from FIG. 1 and FIG. 2, FIG. 4 shows the situation from FIG. 3 with the diaphragm element in the state fastened to the light guide unit, FIG. 5 shows a detailed view of the light guide unit in the region of the light decoupling faces in a partly sectional illustration, FIG. 6 shows the light exposure of a lighting unit as illustrated in FIG. 1, but without interposed diaphragm element, and FIG. 7 shows the light exposure of a lighting unit as illustrated in FIG. 1, with interposed diaphragm element.

FIG. 1 shows a lighting unit 1 according to the invention for a motor vehicle headlight, consisting of a plurality of light sources 2, a light guide unit 3 having a plurality of light guides 30, and a downstream projection lens 4. Each light guide 30 has a light decoupling face 30*a*, and each light source 2 couples light precisely into the light guide 30 associated therewith via a light coupling-in face (not visible in the figures).

The light sources 2 are LED light sources, wherein each LED light source 2 comprises at least one or exactly one light-emitting diode. Here, each LED light source 2 can preferably be actuated and switched on and off and/or dimmed separately, wherein, with two or more light-emitting diodes per LED light source, each light-emitting diode of an LED light source can preferably be actuated and switched on and off and/or dimmed separately.

In the shown illustration, the light-guide unit 3 has a two-part structure formed of two component parts 3*a*, 3*b*, which bear directly against one another and are interconnected when the lighting unit 1 is in the assembled state. However, the light guide unit 3 can just as well be formed from merely one component part, this being of secondary importance to the invention, which is why this topic will not be discussed further here.

The light guides 30 are arranged side by side in the light guide unit 3, and in the shown example are arranged in three rows arranged one above the other. Here, the light guides 30 are oriented substantially in the direction of an optical axis x belonging to the projection lens.

In the shown embodiment, the light guides 30 are formed as reflectors, that is to say virtually form a hollow tube, and have light decoupling faces 30*a*, which are designed to irradiate the light in the direction of the downstream projection lens 4. The light decoupling faces 30*a* as well as the light coupling-in faces (not visible) are thus delimited openings in the light guide unit 3.

In principle, it is also conceivable for these light guide units to be formed for example as light-conducting bodies separate from one another.

As can be seen in particular in FIGS. 1, 2 and 5, the light guides 30 are each delimited by two substantially vertical walls and two substantially horizontal walls, and the light guides 30 of the upper and lower row are rectangular in the shown example, whereas the light guides of the middle row are square.

Each of the vertical walls 31 delimits light guides 30 arranged laterally adjacently and separates these light guides from one another, and the light guides 30 of the middle row are separated from the upper and lower light guides by the horizontal partition walls 32.

These partition walls 31, 32 have a specific wall thickness a, produced by the manufacturing process, in the region of the light decoupling faces 30*a* (for example see FIG. 3 and FIG. 5), such that vertical and horizontal strips are formed in the light exposure between the activated light segments, as is shown schematically in FIG. 6.

In order to reduce or completely eliminate these strips, that is to say the appearance or width thereof, a diaphragm element 5 is arranged between the light guide unit 3 and the projection lens 4, as shown in FIG. 1 in an exploded illustration.

This diaphragm element 5 has apertures 50 separated from one another by aperture partition walls 51, 52, as can be seen clearly in particular in FIGS. 3-5.

Here, the diaphragm element 5 is arranged with respect to the light guide unit 3 in such a way that an aperture 50 of the diaphragm element 5 is arranged to the front of each light decoupling face 30*a* of the light guide unit 3, more specifically in particular in such a way that the light decoupling faces 30*a* are completely free, that is to say are not covered by material of the diaphragm element.

Accordingly, the apertures 50 are formed in such a way that they correspond substantially in terms of shape and size to the light decoupling faces 30*a* associated therewith. Furthermore, in accordance with the invention, on the faces 5*a* of the diaphragm element 5 facing away from the light guide unit 3, the aperture partition walls 51, 52, which delimit the apertures 50 and separate adjacent apertures 50 from one another, have a smaller wall thickness b than the partition wall 31, 32, associated with the respective aperture partition wall 51, 52, of the respective light guide 30 in the region of the light decoupling face 30*a* thereof. This situation can be clearly seen in FIGS. 3 and 4 and also in FIG. 5.

Here, FIG. 3 shows the situation in an exploded illustration for improved clarity, and FIGS. 4 and 5 show the actual situation in which the diaphragm element 5 is arranged as close as possible to the light guide unit and preferably contacts said light guide unit.

In the light exposure, it is not the light decoupling faces 30*a*, but rather the apertures 50, in fact the apertures 50 in the region of the lens-side face 5*a* of the diaphragm element 5, that are therefore reproduced, where the partition walls 51, 52 are only very narrow between the apertures 50 and the undesirable grid in the light exposure between the individual light segments is accordingly formed weakly or even so as to be no longer visible, as is shown schematically in FIG. 7.

As already mentioned, by contrast with the illustration from FIGS. 1 and 3, which, for improved recognisability, show the technical features of the diaphragm element 5 at a (large) distance from the light guide unit 3, the diaphragm element 5 is arranged directly adjacent to the light guide unit 3, preferably contacting the light guide unit 3 in the region of the face thereof formed by the light decoupling faces 30*a*.

Specifically, this means that the aperture partition walls 51, 52 (on the side 5*b* of the diaphragm element 5 facing the light guide unit 3) contact the partition walls 31, 32 between the light guides 30, as can be clearly seen in particular in FIGS. 4 and 5. Light from a light guide 30 is thus reliably prevented from passing into an aperture 50 not associated with this light guide or associated with an adjacent light guide 30. In addition, the lens-side face 5*a* of the diaphragm element 5 can thus be arranged as accurately as possible in the focal plane of the projection lens 4.

So as to obtain specifically an optimal, in particular clear, reproduction of the light segments with the individual light guides 30, it is advantageous if the diaphragm element 5 lies substantially in the focal plane of the projection lens 4.

The face of the light guide unit 3 formed by the light decoupling faces 30*a* of the light guides 30 typically is not planar, but is formed in accordance with the progression of the focal plane of the projection lens, as can be clearly seen in FIG. 1 and FIGS. 3 and 4, that is to say in a manner curved horizontally and preferably also vertically in the direction of the lens.

Accordingly, that is to say in a manner following the shape of this face of the light guide unit 3, the diaphragm element 5 is also curved in a corresponding manner and is formed congruently with this face.

The light decoupling faces 30*a* usually lie in the focal plane of the projection lens 4. In this case, care should be taken to ensure that the diaphragm element 5 is as thin as possible as viewed in the light exit direction so that the face 5*a* of the diaphragm element 5 facing the lens 4, said face now defining the actual light decoupling face, is as close as possible to the focal plane of the projection lens 4.

However, the light decoupling faces 30*a* may also be offset rearwards at least by the thickness d of the diaphragm element 5 in the light exit direction, such that the lens-side face 5*a* of the diaphragm element 5 can be arranged exactly in the focal plane of the projection lens 4.

The wall thickness b of the aperture partition walls 51, 52 can be constant over the entire thickness d of the diaphragm element 5, or, as shown in FIGS. 3 to 5, the wall thickness b of the aperture partition walls 51, 52 can reduce over the thickness d of the diaphragm element 5 in the light exit direction.

In this case, the wall thickness of the aperture partition walls 51, 52 on the face 5*b* facing the light guide unit 3 then advantageously also corresponds to the wall thickness a of the associated partition walls 31, 32 between the light guides 30 in the region of the light decoupling faces 30*a*.

The invention claimed is:

1. A lighting unit (1) for a headlight comprising:

a plurality of light sources (2), a light guide unit (3) having a plurality of light guides (30), a downstream projection lens (4), wherein each light guide (30) has a light decoupling face (30*a*), and wherein each light source (2) couples light precisely into a light guide (30) associated therewith, and wherein adjacent light guides (30) are separated from one another by partition walls (31, 32), and at least one diaphragm element (5) arranged between the light guide unit (3) and the projection lens (4), wherein the at least one diaphragm element (5) has apertures (50) separated from one another by aperture partition walls (51, 52), wherein the at least one diaphragm element (5) is arranged in such a way that an aperture (50) is arranged to the front of each light decoupling face (30*a*) and corresponds substantially in terms of shape and size to the light decoupling faces (30*a*) associated therewith, and wherein, on faces (5*a*) of the at least one diaphragm element (5) facing away from the light guide unit (3), at least part of the aperture partition walls (51, 52) has a smaller wall thickness (b) than the partition walls (31, 32) of the light guide unit (3) associated with the respective aperture partition walls (51, 52).

2. The lighting unit according to claim 1, wherein precisely one diaphragm element (5) is provided, which has a number of apertures (50) corresponding to the number of light decoupling faces (30*a*).

3. The lighting unit according to claim 1, wherein the light guides (30) are arranged in at least two rows arranged one above the other.

4. The lighting unit according to claim 3, wherein a separate diaphragm element is provided for at least one of the rows of light guides (30).

5. The lighting unit according to claim 4, wherein a separate diaphragm element is provided for each row of light guides.

6. The lighting unit according to claim 1, wherein the at least one diaphragm element (5) lies substantially in a focal plane in the projection lens (4).

7. The lighting unit according to claim 1, wherein the at least one diaphragm element (5) is arranged directly adjacent to the light guide unit (3).

8. The lighting unit according to claim 7, wherein the at least one diaphragm element (5) contacts the light guide unit (3) in the region of the face thereof formed by the light decoupling faces (30*a*).

9. The lighting unit according to claim 1, wherein the wall thickness (b) of the aperture partition walls (51, 52) is constant over the entire thickness (d) of the at least one diaphragm element (5).

10. The lighting unit according to claim 1, wherein the wall thickness (b) of the aperture partition walls (51, 52) reduces over the thickness (d) of the at least one diaphragm element (5) in the light exit direction.

11. The lighting unit according to claim 10, wherein the wall thickness of the aperture partition walls on the face (5*b*) facing the light guide unit (3) corresponds to the wall thickness (a) of the associated partition walls (31, 32) between the light guides (3).

12. The lighting unit according to claim 1, wherein each light guide (30) is delimited by two substantially vertical walls (31) and two substantially horizontal walls (32).

13. The lighting unit according to claim 12, wherein on the face (5*a*) facing away from the light guide unit (3), at least the aperture partition walls (51, 52) associated with the vertical and/or horizontal partition walls (31, 32) between the light guides (30) have a smaller wall thickness (b) than the associated partition walls (31) of the light guide unit (3).

14. The lighting unit according to claim 12, wherein on the faces (5*a*) facing away from the light guide unit (3), all aperture partition walls (51, 52) associated with the partition walls (31, 32) between the light guides (30) have a smaller wall thickness (b) than the associated partition walls (31, 32) of the light guide unit (3).

15. The lighting unit according to claim 12, wherein the light decoupling faces (30*a*) of the light guides (30) delimited by the walls (31, 32) form a rectangle or a square.

16. The lighting unit according to claim 1, wherein the at least one diaphragm element (5) is formed from a metal or a plastic.

17. The lighting unit according to claim 1, wherein the aperture partition walls (51, 52) reflect light.

18. The lighting unit according to claim 1, wherein the apertures (50) in the diaphragm element are manufactured by blanking or laser cutting.

19. The lighting unit according to claim 1, wherein the light sources (2) are LED light sources, and wherein each LED light source (2) comprises at least one light-emitting diode.

20. The lighting unit according to claim 19, wherein each LED light source (2) can be actuated and switched on and off and/or dimmed separately.

21. The lighting unit according to claim 19, wherein each light-emitting diode of the LED light source can be actuated and switched on and off and/or dimmed separately.

22. The lighting unit according to claim 1, wherein the at least one diaphragm element (5) is formed as a two-dimensional component part.

23. A vehicle headlight comprising at least one lighting unit according to claim 1.

24. The lighting unit according to claim 1, wherein the headlight is a motor vehicle headlight.

25. The lighting unit according to claim 1, wherein the light guides (30) are arranged in three rows arranged one above the other.

* * * * *